United States Patent
Lorenz et al.

(10) Patent No.: US 7,790,083 B2
(45) Date of Patent: Sep. 7, 2010

(54) METHOD FOR PRODUCING A THROTTLE VALVE UNIT IN A TWO-COMPONENT INJECTION MOLDING PROCESS

(75) Inventors: Christian Lorenz, Aalen-Unterrombach (DE); Wolfram Hasert, Weinstadt (DE); Johannes Meiwes, Markgroeningen (DE); Wolf-Ingo Ratzel, Leinfelden-Echterdingen (DE); Jochen Kaesser, Berglen (DE); Roland Schreiber, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 1204 days.

(21) Appl. No.: 10/562,909

(22) PCT Filed: Jun. 15, 2004

(86) PCT No.: PCT/DE2004/001228

§ 371 (c)(1),
(2), (4) Date: Dec. 30, 2005

(87) PCT Pub. No.: WO2005/002823

PCT Pub. Date: Jan. 13, 2005

(65) Prior Publication Data

US 2006/0138697 A1    Jun. 29, 2006

(30) Foreign Application Priority Data

Jul. 1, 2003   (DE) .............................. 103 29 484

(51) Int. Cl.
*B29C 45/14* (2006.01)
(52) U.S. Cl. .................. 264/264; 264/242; 264/328.8; 264/328.12; 264/259

(58) Field of Classification Search .................. 264/264, 264/242, 259, 328.8, 328.12
See application file for complete search history.

(56) References Cited

U.S. PATENT DOCUMENTS 3,960,177 A    6/1976 Baumann (Continued)

FOREIGN PATENT DOCUMENTS

EP    0 482 272 A1    4/1992

(Continued)

OTHER PUBLICATIONS

W. Woebcken, "Beitrag zur Qualitaetsverbesserung von Spritzgussteilen aus amorphen und Teilkristallinen Thermoplasten durch Tempern", Plastverarbeiter, Zechner und Huethig Verlag GmbH, Nov. 1977, pp. 569-572, XP-001173543, vol. 28, No. 11, Speyer/Rhein, Germany.

(Continued)

*Primary Examiner*—Christina Johnson
*Assistant Examiner*—Galen Hauth
(74) *Attorney, Agent, or Firm*—Ronald E. Greigg

(57) ABSTRACT

A method for manufacturing a throttle valve unit having a housing part and a valve flap part that can move in relation to it includes the steps of injection molding the housing part of a first plastic material in a first cavity, transferring the molded housing part to a second cavity spatially decoupled from the first cavity, and injection molding the movable valve flap part out of a second plastic material in a second mold cavity inside the molded housing part. Before the molded housing part is transferred to the second cavity, it is subjected to an intermediate treatment in order to influence the shrinkage behavior, thereby selectively adjusting the gap geometries between the parts.

10 Claims, 10 Drawing Sheets

U.S. PATENT DOCUMENTS

| | | |
|---|---|---|
| 4,414,170 A | 11/1983 | Sano |
| 4,702,156 A | 10/1987 | Sano |
| 5,304,336 A | 4/1994 | Karlsson et al. |
| 5,340,357 A | 8/1994 | Nagai et al. |
| 5,421,718 A | 6/1995 | Karlsson et al. |
| 5,482,506 A * | 1/1996 | Tsuda et al. ............ 454/155 |
| 5,693,271 A * | 12/1997 | Johnson et al. ........... 264/45.7 |
| 2003/0024576 A1 | 2/2003 | Schaefer et al. |

FOREIGN PATENT DOCUMENTS

| | | |
|---|---|---|
| JP | 52-109556 | 9/1977 |
| JP | 57-70627 | 5/1982 |
| JP | 61-118458 | 6/1986 |
| JP | 61-121913 | 6/1986 |
| JP | 2-305930 | 12/1990 |
| JP | 5-141540 | 6/1993 |
| JP | 5-292593 | 11/1993 |
| JP | 7-242286 | 9/1995 |
| JP | 10-205359 | 8/1998 |
| JP | 10-252507 | 9/1998 |
| JP | 10-266873 | 10/1998 |
| JP | 11-101350 | 4/1999 |
| JP | 11-226985 | 8/1999 |
| JP | 11-294203 | 10/1999 |
| JP | 2000-20866 | 1/2000 |
| JP | 2000-204974 | 7/2000 |
| JP | 2001-74156 | 1/2001 |
| JP | 2003-1700 | 1/2003 |

OTHER PUBLICATIONS

FR. Johannaber/W. Michaeli, "Handbuch Spritzgiessen", 2002, pp. 265-268, XP-002303940, Carl Hanser Verlag, Munchen Wien, Germany.

* cited by examiner

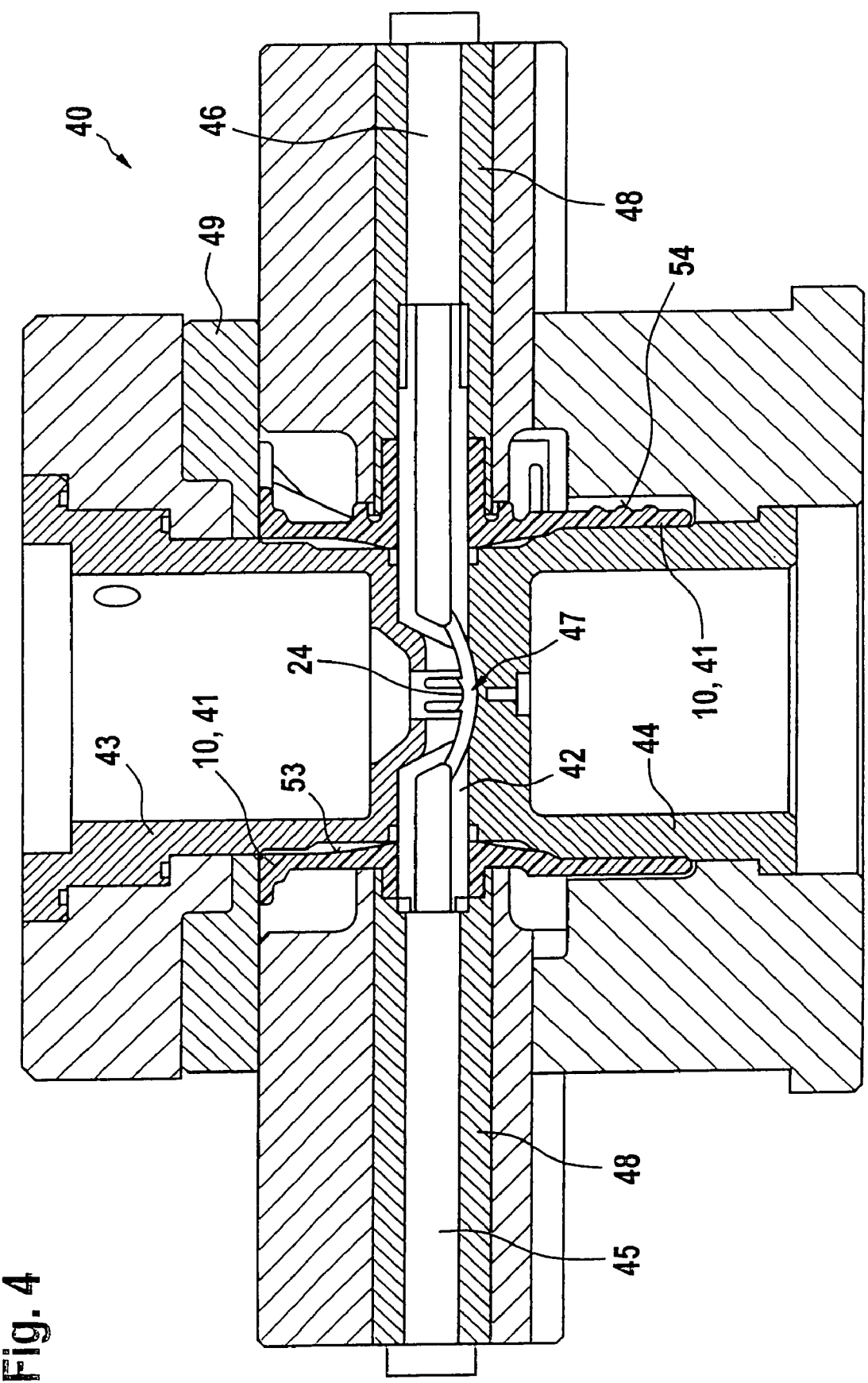

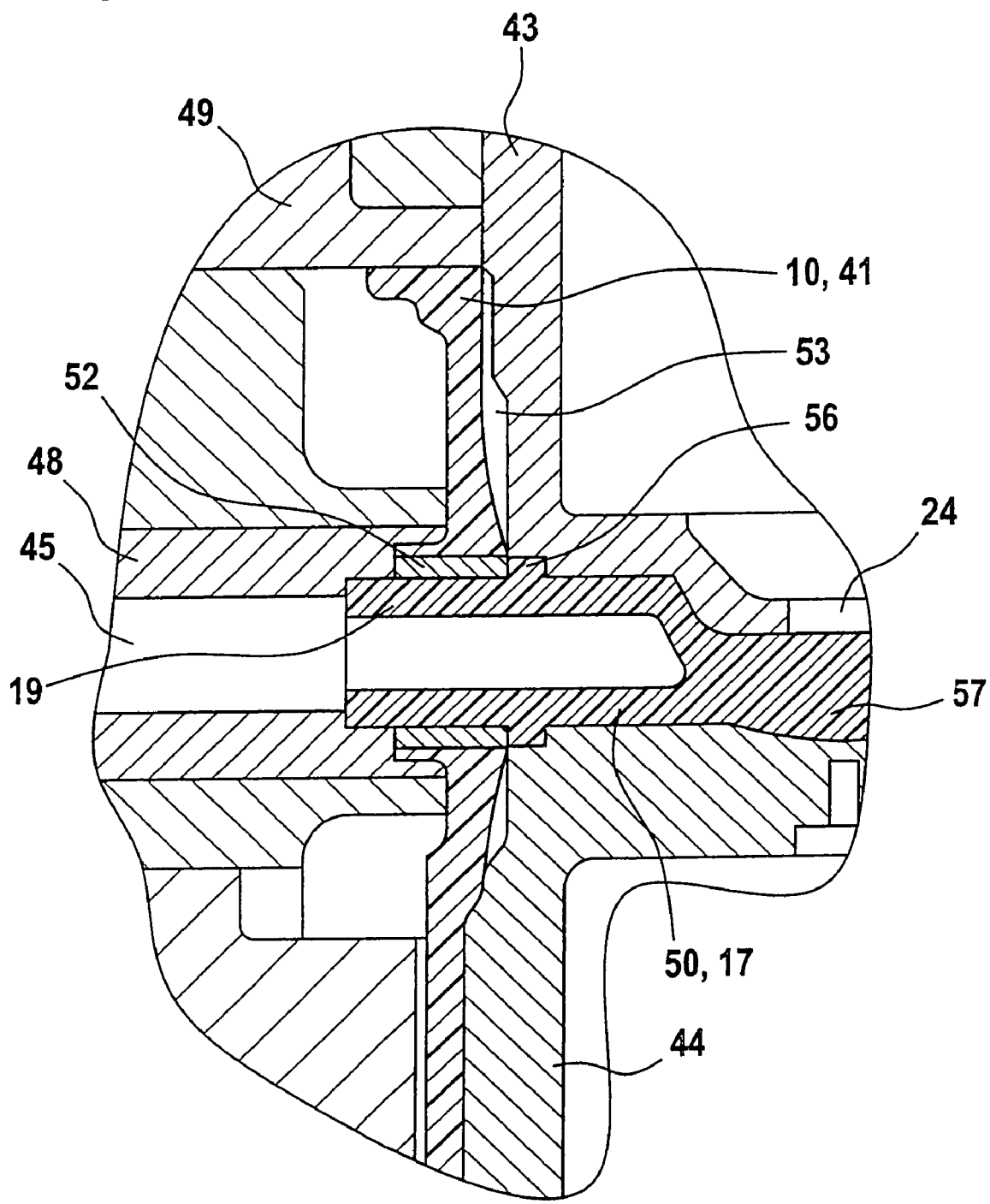
Fig. 5.1

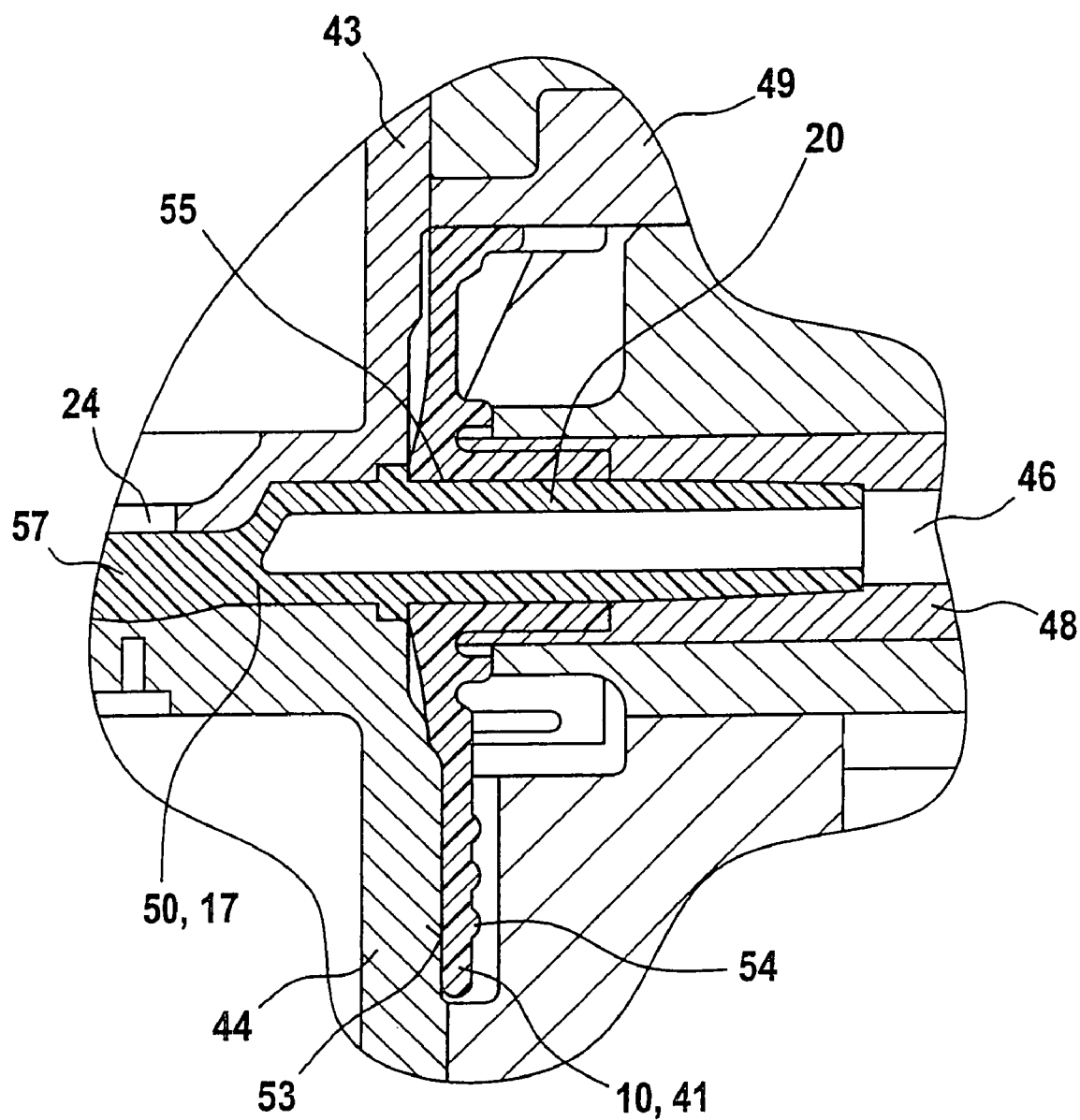
Fig. 5.2

US 7,790,083 B2

METHOD FOR PRODUCING A THROTTLE VALVE UNIT IN A TWO-COMPONENT INJECTION MOLDING PROCESS

CROSS-REFERENCE TO RELATED APPLICATIONS

This application is a 35 USC 371 application of PCT/DE 2004/001228 filed on Jun. 15, 2004.

BACKGROUND OF THE INVENTION

1. Field of the Invention

This invention relates to throttle valves for internal combustion engines, and more particularly to an improved process for producing such throttle valves.

2. Description of the Prior Art

Today in the automotive field, throttle valve units are increasingly being produced in large batches as injection-molded plastic components. For example, throttle valve units of this kind are valve housings manufactured by means of the injection molding process, with valve flaps that are injection molded into the housing. The throttle valve units that are used in the automotive field are subjected to temperatures between −40° C. and 120° C. so that care must be taken to assure the operational reliability of molded parts in this temperature range, specifically with regard to gap widths that can be achieved in the injection molding process.

EP 0 482 272 A1 discloses a valve device and a method for manufacturing a moving valve flap in a housing that accommodates the moving valve flap. The valve flap and valve housing are manufactured in the same mold. The housing is manufactured in a first injection molding step and the disk-shaped valve flap is molded inside it in a subsequent injection molding step. On the valve flap that moves in relation to the housing, sealing sections are provided, which cooperate in a sealing fashion with housing regions of the valve housing. The valve flap is preferably of the butterfly type and the valve housing is preferably of the type designed to accommodate a butterfly type valve flap. The disclosed manufacturing method is capable of significantly reducing the cost of producing a valve device for the automotive field. In this embodiment variant, the valve flap and its housing are positioned transversely in relation to the air flow direction.

U.S. Pat. No. 5,304,336 likewise relates to a method for manufacturing a valve device containing a moving part and a housing for accommodating the moving part. The moving part and the housing are produced in sequential manufacturing steps of an injection molding process. Preferably, the housing is injection molded in a first process step and the part that moves in relation to the housing is produced in another manufacturing step in which this moving part is situated in an at least partially closed position. According to the disclosed manufacturing method, a surface of the housing serves as at least a portion of a mold for forming a sealing portion of the movable valve flap, thus achieving a very close tolerance between the housing and the valve flap that moves in relation to it. Also according to U.S. Pat. No. 5,304,336, the valve flap that moves in relation to the housing is embodied as butterfly-shaped. The housing is preferably of the type that accommodates a butterfly type valve flap.

The manufacturing methods known from EP 0 482 272 A1 and U.S. Pat. No. 5,304,336 for producing an air-guiding part by means of an injection molding process have the disadvantage that these methods may produce molded parts that can be insufficient in their operational reliability. This is essentially due to an insufficient adjustability and reproduction precision of required gap widths in the shaft bearings and in the gas passage bore in devices manufactured in this way. With the methods described above, it is not sufficiently possible to selectively influence the gap width by means of machine setting parameters during formation, i.e. during the injection molding process, in order to achieve a definite air quantity in the closed position of the valve flap. From one production cycle to the next, the required gap widths cannot be sufficiently reproduced to attain a definite leakage air quantity in the closed position of the valve flap.

It is only permissible for the precision or uniformity of such gaps in valves to vary within a range of a few μm. This is of considerable importance in the automotive field in which such air-guiding parts are subjected to a larger range of temperatures from −40° C. to 120° C. (engine operation temperature in the cylinder head region). Due to a close interconnection between the temperature of the molding tool and the cycle time of the injection molding process according to the above-cited manufacturing methods, the required degree of precision cannot be achieved by means of the cavity provided in the molding tool. This is particularly true when, according to the methods in the embodiments described above, partially crystalline or amorphous thermoplastic high-temperature plastics are used for the above-indicated temperature range for applications in the engine compartment. According to the manufacturing methods known from EP 0 482 272 A1 and U.S. Pat. No. 5,304,336, it is not possible to react flexibly enough to process fluctuations, e.g. property fluctuations in the molding compounds during molding, i.e. the production process that is part of the injection molding process. The fluctuations described have an impermissibly powerful impact on the quality of the devices obtained.

OBJECT AND SUMMARY OF THE INVENTION

The embodiment proposed according to the present invention remedies the above-mentioned disadvantages of the method known from the prior art because the formation of the molded parts, i.e. the valve flap part and the housing part, does not occur in the same cavity. In the method proposed according to the present invention, the cavities are divided into two separate cavities in a two-component mold. The two separate cavities can be accommodated in two separate forming molds by means of turntables, index plates, or similar tools. The geometry of essential molding regions of the housing part can be used during the reverse injection molding of the flap part in the second injection molding step to elastically deform the housing part (premolded part) in the second injection molding step by changing the outer geometry of the surrounding mold parts in the second cavity in relation to the first cavity. This offers an additional possibility for influencing the gap formation occurring between the bearing points and the housing part as well as between the boundary wall of the valve flap part and the housing part. According to the method proposed by the present invention, the two separate cavities are injected with partially crystalline and amorphous high-temperature thermoplastics that have high melting temperatures, possibly high crystallization coefficients, and high resistances to heat distortion, oil, and fuel. The partially crystalline or amorphous high-temperature thermoplastics used have low coefficients of friction and low wear rates in relation to each other.

In addition, in one embodiment variant according to the invention of the proposed injection molding process, after the housing part is demolded from the first cavity in the first injection molding step, it can then be immediately subjected to an intermediate treatment above the glass temperature of the plastic that has been injected in the first injection molding step. The glass temperature is the glass transition temperature above which the molecular movement of polymer chains in the plastic increases abruptly (transition from hard/brittle to toughened/elastic breakage behavior).

The intermediate treatment of the premolded housing part between the first injection molding step and the second injection molding step reduces the subsequent tendency of the housing part (premolded part) to warp during operation. After the premolded part is demolded from the cavity of the first injection molding step, then it can be immediately subjected to a high temperature level, which temperature level lies above the glass temperature of the plastic material used in the first injection molding step. At the high temperature level during the intermediate treatment, the stresses induced by molecular orientations during the filling process of the cavities or by delayed crystallization effects during the rapid cooling process of the premolded part taper off during the time that the premolded part spends, for example, inside an annealing chamber or warming cabinet. Without the intermediate treatment, after the end of the first injection molding step, the molecular orientations or the delayed crystallization effects would, over months and years, lead to recovery deformations of the housing part injection molded in the first injection molding step. Over the operating time of a throttle valve unit, this leads to a change in the gap dimension and therefore to impairment of the function to the point of a possible jamming or seizing of the valve flap part that is situated in a moving fashion inside a gas passage of the housing part.

Due to the intermediate treatment of the premolded housing part—and consequently before its insertion into the second cavity during the second injection molding step—the housing part is brought into a state of extremely low internal stresses and high dimensional reproducibility. At the same time, the intermediate treatment serves as a buffer step to regulate the state of the premolded housing part with regard to the part temperature and the stress state inside the housing part before its insertion into the second cavity in a second molding station of an injection mold or injection molds that are used in series. This makes it possible to circumvent potential interruptions in production that result in irregularities in the production flow and therefore to quality losses, rejection of premolded parts, and restarting losses. This means it is also possible to circumvent production interruptions by having the housing part remain in an oven until production interruptions have been eliminated and the production process can then continue. In addition to a heat treatment of the premolded housing part in a warming cabinet, it is also possible to couple mechanically or electromagnetically produced oscillations into the premolded housing part. The stresses induced in the premolded housing part by polymer chain orientation during the filling process of the cavities or by delayed crystallization effects can also be reduced down to a residual stress level that is noncritical for the subsequent process by subjecting the premolded housing part to black infrared radiation. The intermediate treatment step to which the premolded part obtained from the first injection molding station is subjected can, generally speaking, be characterized by a light and heat treatment of the premolded housing part (premolded part).

In another embodiment variant of the manufacturing process for a throttle valve unit proposed according to the present invention, after the intermediate treatment following the first injection molding step and before the insertion of the premolded part into the second cavity of a second injection molding station, another material can be applied to or rubbed into the subsequent molding surfaces for the second injected plastic material for the molding of the valve flap part inside the premolded part. This material primarily serves as a lubricant and as a spacer layer that is to be applied, for example also in sheet form, and is easy to partially or completely remove, e.g. by means of thermal influence.

In order to further reduce frictional resistances and wear of the bearing points between the housing part and the valve flap part, it is also possible to insert bushes made of a third material. The slide bushes or bearing bushes can be inserted into the premolded housing part in such a way as to prevent them from rotating in relation to it so that the flap shaft parts molded onto the preferably dome-shaped valve flap part are able to rotate in relation to the valve flap part or are inserted into the premolded housing part so that the bushes can rotate in relation to the premolded housing part; the flap shaft parts of the preferably dome-shaped valve flap part are then injection molded into the slide bushes or bearing bushes that are inserted into the wall of the premolded housing part. Both of these embodiment variants are possible with the method proposed according to the present invention. The bearing bushes are preferably made of a wear-resistant metallic or nonmetallic bearing material.

With the method proposed according to the present invention for manufacturing a throttle valve unit that includes a housing part and a valve flap part that can move in relation to it, after the injection molding of the housing part out of a first plastic material in a first cavity, the subsequent transfer of the resulting premolded part of the housing part into a second cavity spatially separate from the first cavity, and the injection molding of the movable valve flap part out of a second plastic material inside the premolded part of the housing part in the second cavity, a third material can be introduced into the gap geometries of the resulting two-component injection molded part. If the gap geometries inside the two-component injection molded part, which is provided with bushes, lie outside a tightness specification before the introduction of the third material, then after the introduction of the third material and its possible partial removal, the above-mentioned gap geometries lie within the tightness specification. According to this embodiment variant of the method proposed according to the present invention, in order to increase gap tightness, powdered solid particles or paste-like prepared materials can be introduced as a third material into the two-component injection molded part and later be partially removed again.

In a two-component injection molded part whose housing part is made of a first plastic material and whose valve flap part is made of a second plastic material and in which the bushes are comprised of a third material, if the gap geometries lie outside a tightness specification before the introduction of a fourth material, then after the introduction of the fourth material and its possible partial removal, said gap geometries now lie within the tightness specification. According to this embodiment variant of the method proposed according to the present invention to increase gap tightness, powdered solid particles or paste-like prepared materials can be introduced as a fourth material into the two-component injection molded part with bushes and later be partially removed again.

BRIEF DESCRIPTION OF THE DRAWINGS

The present invention will be described in detail below in conjunction with the drawings, in which:

FIG. 4 shows a premolded part inserted into a second injection molding station and a second cavity for the injection of a second plastic material, FIGS. 5.1, 5.2 show valve flap parts that have been injection molded of a second plastic material inside the premolded part of the housing part in the second cavity and whose valve flap shaft parts are provided with an insert bush/slide bush in FIG. 5.1 and whose valve flap shaft parts are molded directly into the premolded part in FIG. 5.2.

DESCRIPTION OF THE PREFERRED EMBODIMENTS

Figure 1:
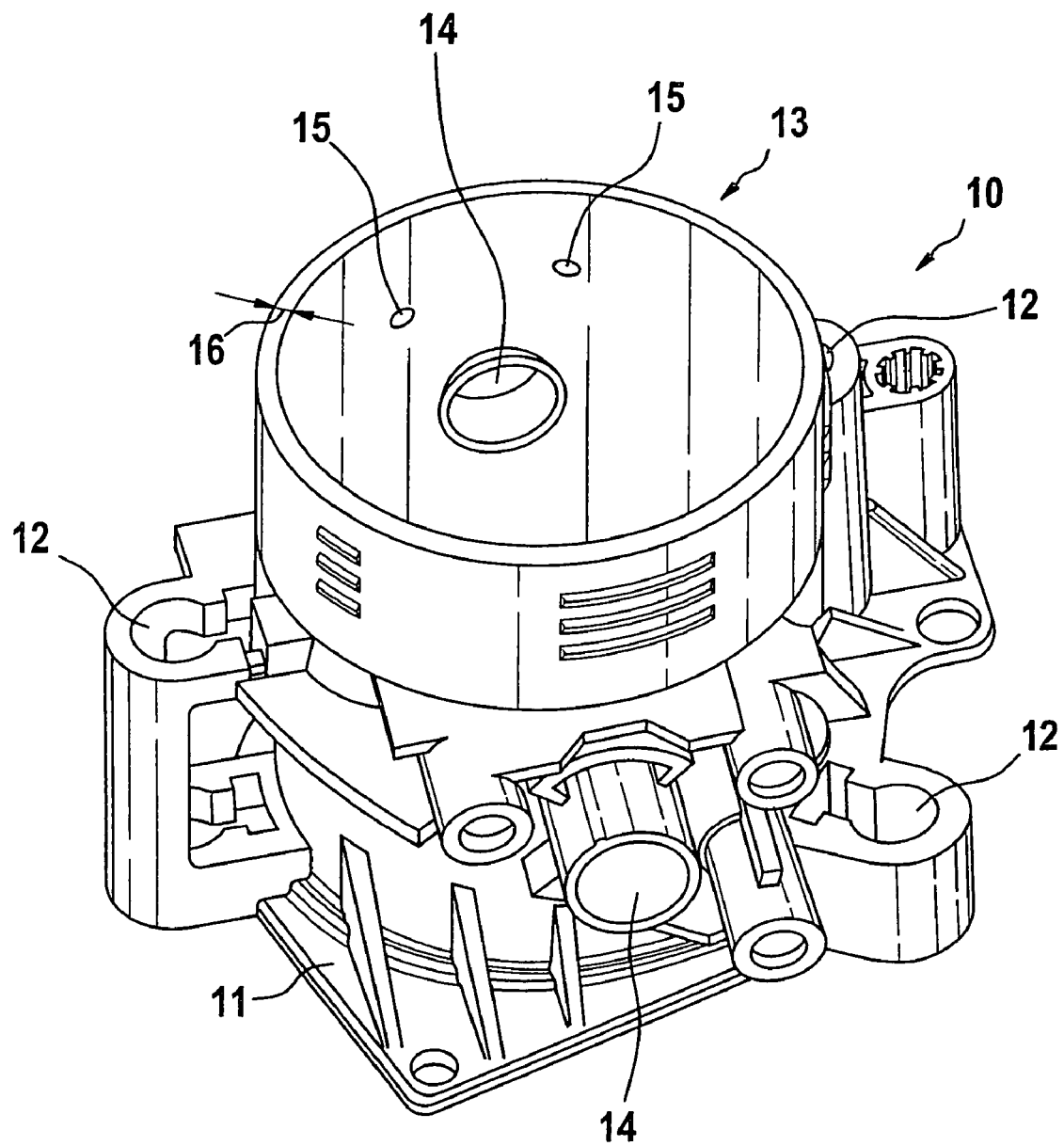
FIG. 1 shows a premolded housing part comprised of a first plastic material.

FIG. 1 shows a premolded housing part made of a first plastic material. Housing part 10 of a throttle valve unit used in the intake line of an internal combustion engine, which part is injection molded component made of a first plastic material. The first plastic material can be selected from among partially crystalline thermoplastics and amorphous high-temperature thermoplastics that have high melting temperatures and high crystallization gradients as well as excellent resistances to heat distortion, oil, and fuel. The amorphous high-temperature thermoplastics that can be used have a very high glass temperature that is at least 30 K above the continuous use temperature of the throttle valve unit. The above-mentioned materials also have low coefficients of friction and low wear rates. The housing part 10 has a flange 11 on which flange attachments 12 are provided in accordance with the available installation space. The housing part 10 delimits a gas passage 13 and is embodied with a wall thickness 16. The wall of the gas passage 13 contains opposing openings 14 to accommodate a valve flap part 17 that will be molded into place in another process step. The housing part 10 is produced as a premolded part in a first injection molding station. Injection points via which the first plastic material is conveyed into the first injection molding station are labeled with the reference numeral 15. Although only two injection points 15 are depicted in FIG. 1, it is possible to provide a number of injection points 15, for example up to 8 of them, via which the first plastic material is conveyed into the first cavity.

Figure 2:
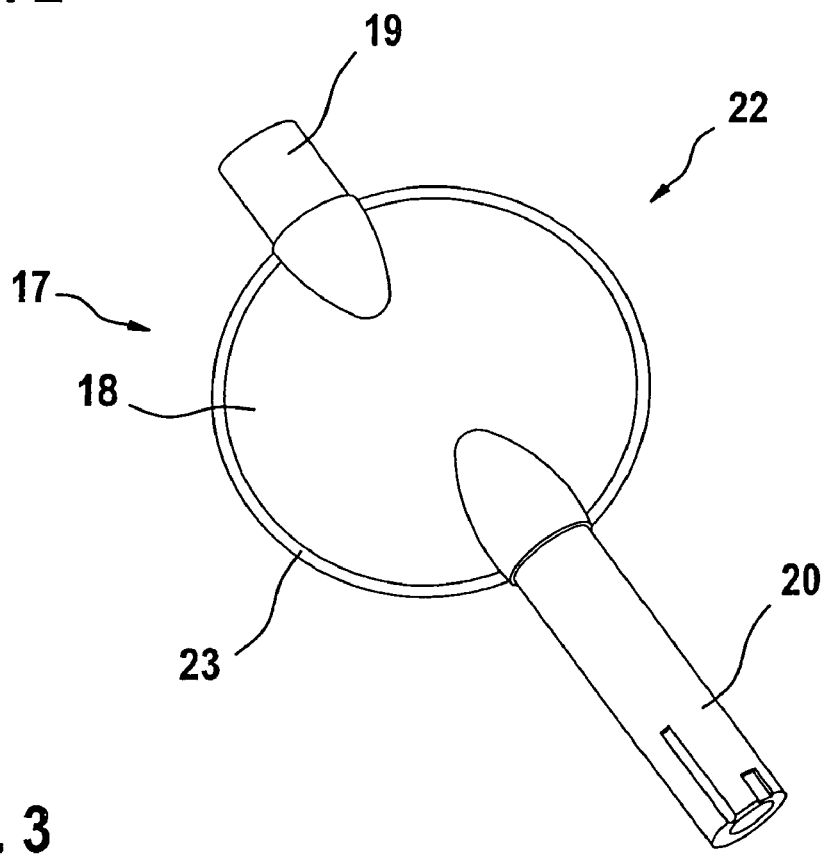
FIG. 2 shows a valve flap part with a domed flap surface, viewed in the direction from which the flow strikes it.

The valve flap part 17 shown in FIG. 2 has a slightly convex domed flap surface 18 onto which a first flap shaft part 19 and a second flap shaft part 20 are molded. The flap surface 18 is provided with a sealing edge 23. The valve flap part 17 with the first flap shaft part 19 and second flap shaft part 20 molded onto it can be made of a second plastic material that can also be a partially crystalline thermoplastic or amorphous high-temperature thermoplastic, which materials have high melting temperatures and high crystallization gradients. The second plastic material also has a high resistance to heat distortion, oil, and fuel and is distinguished by a low coefficient of friction and low wear rate in comparison to the material of the premolded part 41 constituting the housing 10. If care is taken to respect process engineering parameters, then it is also possible for the valve flap part 17 to be made of the same plastic material as the premolded part 41 manufactured in the first cavity.

The second plastic material, which is injected into the premolded housing part and constitutes the preferably domed valve flat part 17, can either be a partially crystalline thermoplastic or amorphous high-temperature thermoplastic with a melting temperature that is lower than the melting temperature of the first plastic material of the premolded housing part or, if care is taken to respect process engineering parameters, then it is possible to use a partially crystalline thermoplastic or an amorphous high-temperature thermoplastic with a melting temperature that is higher than the melting temperature of the first plastic material of the premolded housing part.

Figure 3:
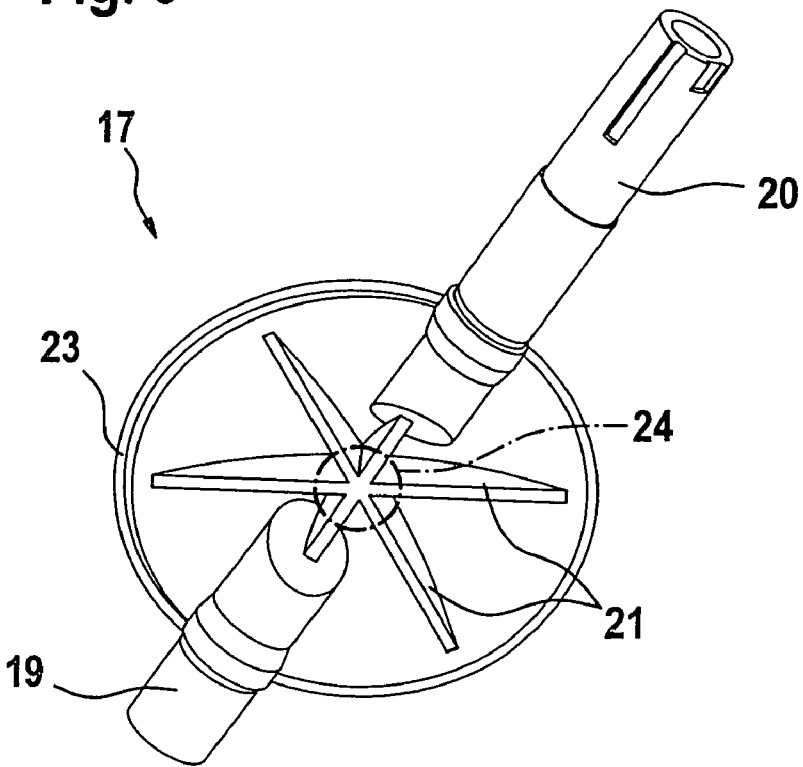
FIG. 3 shows the valve flap part viewed from the rear, with a ribbed flap surface.

FIG. 3 shows a rear view of the valve flap part from FIG. 2, with a ribbing 21 on the rear flap surface oriented away from the side struck by the flow. The ribbing 21 extends approximately in the shape of a star on the back of the flap surface 18, leading out from an injection point 24 via which the second plastic material is injected into a second cavity of a second injection molding station. The first flap shaft part 19 extends from the flap surface 18 of the valve flap 17 and the elongated second flap shaft part 20 extends from the drive side of the valve flap part 17. FIG. 3 clearly shows the back of the sealing edge 23 extending around the circumference of the flap surface 18. In order to achieve the required mechanical strength, is also possible to provide reinforcing ribs in the circumference direction (for example in an elliptical or rounded form).

FIG. 4 shows a premolded part inserted into a second injection molding station and a second cavity for the injection of a second plastic material via an injection point 24 for the valve flap part.

The second injection molding station 40 contains a premolded part 41 embodied in the form of a housing part 10 of a throttle valve unit. To execute the second injection molding step inside the second injection molding station 40, the premolded part 41 is removed from a first cavity of a first injection molding station. After the premolded part 41 is injection molded out of a first plastic material, the premolded part 41 in an injection molding device can be conveyed to the second injection molding station 40 by being moved manually, or through actuation of a turntable that transports the premolded part 41, actuation of an index plate, or actuation of a manipulation system. In the second injection molding station 40, a second cavity 42 is provided to form the valve flap part 17 that is to be integrated into the premolded part 41. During the reverse injection molding of the valve flap part 17 in the second injection molding station 40, the geometry of essential molding regions on the premolded part 41 can be used to elastically deform or prestress the premolded part 41 in the second injection molding step inside the second injection molding station 40 by changing the outer geometry of the surrounding mold parts of the second cavity 42 in relation to the first cavity. This offers the possibility of using mold engineering to influence a subsequent gap formation between the sealing edge 23 of the valve flap part 17 and the bearing points in the premolded part 41.

By using the method proposed according to the present invention, the sealing edge 23 of the valve flap part 17 can on the one hand be embodied so that in the finished injection molded part, the valve flap part 17 contactlessly passes through the gas passage 13 in the premolded housing part 10. When a valve flap part 17 is embodied so that it passes through, the sealing edge 23 on the valve flap part 17 is considered to be sealed in terms of tightness specifications, i.e. in terms of actual use, an air mass flow of 2 to 6 kg/h is permitted at the gap between the valve flap part 17 and the inner wall of the gas passage 13, which is considered to be "tight" in terms of tightness specifications depending on the diameter of the gas passage 13 in the premolded housing part 10. Alternatively, the valve flap part 17, which is preferably embodied with a domed flap surface and is injection molded into the premolded housing part, can also be embodied as a valve flap part 17 that does not pass through, which usually reaches its tightest position in the gas passage 13 at an inclined position between 8° and 10° in relation to a perpendicular 90° position of the valve flap part 17 in the gas passage. Even with valve flap parts 17 that do not pass through, in the "tight position" of the valve flap part 17 that pivots in the premolded housing part 10, an air mass flow of 2 kg/h to 6 kg/h is permitted between the sealing edge 23 and the inner wall of the gas passage 13. A throttle valve that does not pass through and is embodied in this way is considered to be "tight" in terms of the tightness specifications. Depending on the diameter dimensions of the gas passage 13 in the premolded housing part 10, it is also possible for there to be permissible air mass flows greater than the 2 kg/h to 6 kg/h indicated above; the throttle valve unit is still considered to be "tight" in terms of the tightness specifications, even with the increased air mass flows bypassing the sealing edge 23.

The second injection molding station 40 according to FIG. 4 contains the second cavity 42, which is defined by the opposing end surfaces of a first mold insert 43 and a second mold insert 44. On the side of the first mold insert 43 delimiting the second cavity 42, a contour 47 is provided; in addition, the injection point or gate 24 is situated on the side of the first mold insert 43 oriented toward the second cavity 42. It is clear from FIG. 4 that the contour 47 of the first mold insert 43 serves to mold the ribbing 21 embodied on the back of the flap surface 18. The ribbing 21 and the contour of the flap surface are designed in accordance with the mechanical and flow engineering requirements in the throttle valve unit to be manufactured. In addition to the flap surface 18 of the valve flap part 17 being domed, it can also be embodied as flat.

The second cavity 42 is also delimited by a first core part 45 and a second core part 46. The second plastic material that is injected into the second cavity 42 flows around the opposing tips of the core parts 45 and 46. This produces hollow spaces of the first flap shaft part 19 and the second flap shaft part 20 in the second cavity 42. Inside the second injection molding station 40, the core parts 45 and 46 are enclosed by sleeves 48, which can be designed to be removed either in the horizontal direction or in the vertical direction. To vary the geometry, a spacer ring 49 is accommodated underneath the first mold insert 43.

The premolded part 41 inserted into the second injection molding station 40 in FIG. 4 has an inner wall labeled with the reference numeral 53 and is embodied with the wall thickness 16. The outer wall of the premolded part 41 is labeled with the reference numeral 54.

In the method proposed according to the present invention, before the premolded part 41 is inserted into the second injection molding station 40, an intermediate treatment of the premolded part 41 can take place after the first injection molding step, i.e. after the removal from the first molding station and before insertion of the premolded part 41 into the second injection molding station 40 in FIG. 4. After the housing part 10, 41 is removed from the first cavity, i.e. after the first injection molding step is completed, the premolded part 41 is immediately given a thermal intermediate treatment above the glass temperature of the first plastic material. This can occur, for example, inside an annealing chamber or warming cabinet. At the temperature level at which the intermediate treatment is performed, stresses induced in the thermoplastic during injection molding taper off. This is true not only for partially crystalline thermoplastics but also for amorphous high-temperature thermoplastics. After the premolded part 41 has been subjected to a few minutes of intermediate treatment, stresses and shrinkage effects, which have been induced in the thermoplastics by molecular orientations in the filling process of the first cavity and by delayed crystallization effects in the rapid cooling of the premolded part 41, are relieved or taper off to a negligible residual level. Without the execution of an intermediate treatment, the stresses, which have been induced in the partially crystalline thermoplastics by molecular orientations and by delayed crystallization effects in the rapid cooling of the premolded part 41, remain inherent in the premolded part 41 during its subsequent service life. The thermal intermediate treatment prevents the induced stresses from leading to a possible recovery deformation of the premolded part 41 and therefore to a change in the gap geometries during an extended operating time of the throttle valve unit. The change in the gap geometries due to recovery deformations of the housing 10, i.e. the premolded part 41, without thermal intermediate treatment would in the extreme case lead to possible seizing of a valve flap part 17 that moves in relation to the premolded part 41.

In lieu of the above-described thermal intermediate treatment, in the broadest sense, light and thermal energy can be coupled into the premolded part 41. For example, an intermediate treatment can be carried out by coupling black infrared radiation into the premolded housing part 10; in addition it is also quite possible to couple oscillations—be they electromagnetic or mechanical—into the premolded housing part 10. It is also possible to radiate oscillatory energy into the premolded part 41 in order to reduce stresses inside the second injection molding station 40.

The intermediate treatment executed before the second injection molding step, i.e. before the second injection molding station 40, brings the premolded part 41 into a state with a minimum of internal stresses and a high degree of dimensional reproducibility before insertion into the second cavity 42 of the second injection molding station 40. The intermediate treatment following the first injection molding step simultaneously serves as a buffer step for regulating the state with regard to the component temperature of the premolded part 41. The premolded part 41 subjected to an intermediate treatment has a temperature at approximately the same temperature level as at the end of the first injection molding step inside the first injection molding station. This makes it possible to largely avoid possible production interruptions that lead to irregularities in the production process and therefore to quality losses and prevents a rejection of premolded parts 41 or restarting losses due to intermediate storage of the premolded parts of the housing parts 10 at high temperatures.

In a modified embodiment variant of the method proposed according to the present invention, after the intermediate treatment of the premolded part 41 between the first injection molding station and the insertion of the premolded part 41 into the second injection molding station 40, another, third material can be applied to and/or rubbed into subsequent molding surfaces of the second injected plastic material in the premolded part. The application of another, third material prevents a direct contact of the first plastic material of the premolded part 41 with the second plastic material of which the valve flap part 17 is injection molded during the second injection molding step in and injection molding station 40. It is thus possible to use plastic materials that would otherwise adhere to each other and whose use would otherwise not make sense. An adhesion of the first plastic material to the second plastic material is prevented by introducing or rubbing in an additional third material. The introduction or rubbing-in of the additional, third material also makes it possible to use identical first and second plastic materials. Preferably, lubricants that are used in solid form or in the form of paste-like prepared materials can be used for this additional material. These lubricants reduce friction forces and thus significantly reduce the abrasive wear between parts that contact one another, i.e. the inside of the gas passage 13 and the sealing edge 23 of the flap surface 18 as well as the shaft bearings. The additional, third material applied to the molding surfaces can also function as a spacer layer. It can either be applied by means of being rubbed in or be applied in sheet form and can later be completely or partially removed with ease, e.g. by means of thermal influence. The additional, third material can be used to form an additional, very precisely adjustable gap dimension that cannot yet be achieved by means of the injection molding process of the second plastic material in the second injection molding station 40.

FIGS. 5.1, 5.2 show the second cavity, which is completely filled with the second plastic material; in the embodiment variant according to FIG. 5.1, an insert sleeve has been inserted into the premolded part and in the embodiment variant shown in FIG. 5.2, the valve flap part is injection molded directly into the wall of the premolded part.

The second plastic material 57 is injected via the injection point 24 in the first mold insert 43 into the second cavity 42, which no longer exists in FIGS. 5.1 and 5.2 because in this state, it has already been completely filled with the second plastic material 57. A valve flap part 17 is molded inside the premolded part 41 in accordance with the contouring of the two mold insert 43 and 44 delimiting the second cavity 42. This valve flap part 17 has flap shaft parts 19 and 20 formed onto it, which are comprised of the second plastic material 57. In order to prevent accumulations of material, hollow spaces are produced inside the flap shaft parts 19 and 20 by means of the removable core parts 45 and 46 against which molding takes place in the second injection molding station 40 (see depiction in FIGS. 1 and 3).

The flap shaft parts 19 and 20 pass through the inner wall of the premolded part 41, which represents the housing part 10. The inner wall of the premolded part 41 is labeled with the reference numeral 53 and its outer wall is labeled with the reference numeral 54. Inner surfaces oriented toward one another at the flap shaft parts 19 and 20 and constituting the wall of the premolded part 41 are produced in accordance with the shape of the delimiting surfaces of the first mold insert 43 and second mold insert 44, which surfaces are oriented toward each other and now define the second cavity 42 filled with the second plastic material 57. Adjacent to the first sealing surface 55 in the axial direction, before the second injection molding step, slide bushes 52 (see FIG. 5.1) can be slid or press-fitted onto the flap shaft parts 19 and 20 through the openings 14 for the flap shafts provided in the premolded part 41. When the second plastic material 57 is injected via the injection point 24, these slide bushes are filled by the second plastic material and are consequently accommodated in a precisely fitting fashion on the first flap shaft part 19 and the second flap shaft part 20. The slide bush labeled with the reference numeral 52 is comprised of a third material with friction-reducing and wear-reducing properties and extends in the axial length of the respective flap shaft part 19, 20. In the depiction in FIG. 5.2, the flap shaft part 20 is injection molded directly into the wall of the premolded part 41 without the interposition of an insert sleeve of the kind shown in FIG. 5.1. This applies analogously to the first flap shaft part 19.

However, it is just as possible for the flap shaft part 20 situated on the drive unit side of the valve flap part 17 in FIG. 5.2, which is depicted without a slide bush 52, and the flap shaft part 19 as well, to be provided with a corresponding slide bush. FIG. 5.1 shows the flap shaft part 19, which is provided with a slide bush 52.

Figure 6:
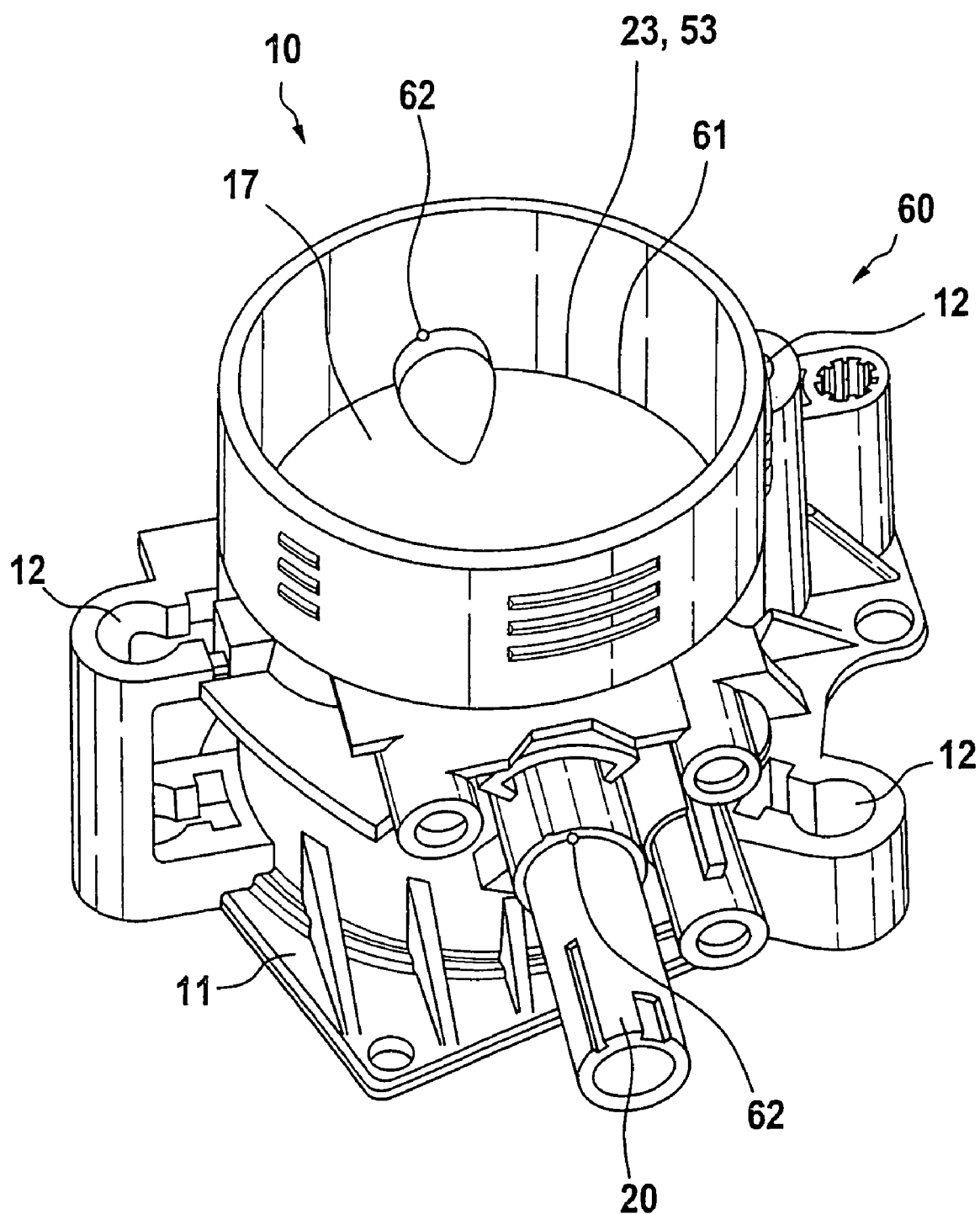
FIG. 6 shows the housing part with a moving valve flap part injection molded into the premolded part of the housing part obtained in separate cavities, after it has passed through a first injection molding station and a second injection molding station.

FIG. 6 shows the molded part obtained in separate first and second cavities, after completion of a first and second injection molding step with a movable valve flap part 17 injection molded into the housing part 10 of an air conveying device. It is clear from FIG. 6 that the premolded part constituting the housing part 10 accommodates the valve flap part 17. Shrinkage of the materials produces a valve gap 61 between the sealing edge 23 of the flap surface 18 made of the second plastic material 57 and the inner wall 53 of the gas passage 13. Valve gaps 62 are also produced in the region of the valve bearings. The flap shaft parts 19 and 20 pass through openings provided for them, not shown in FIG. 6; the second flap shaft part 20 is embodied as longer in the axial direction. A two-component injection molded part 60 of the kind shown in FIG. 6 has a flange 11 in its base region, which can be attached to additional intake line components, for example on an internal combustion engine, depending on the hole pattern and the available installation space.

In FIG. 6, the valve flap part 17 rotated into the closed position closes the gas passage 13, forming a valve gap 61 between the sealing edge 23 of the flap surface 18 of the valve flap part 17 and the inner wall 53 of the gas passage 13 of the housing part 10. While the premolded part 41, which constitutes the housing part 10 of the throttle valve unit and is manufactured in a first injection molding step in a first injection molding station, is made of a first plastic material, the valve flap part 17, which is injection molded in the second cavity 42 of the second injection molding station 40, is made of a second plastic material 57.

Figure 7:
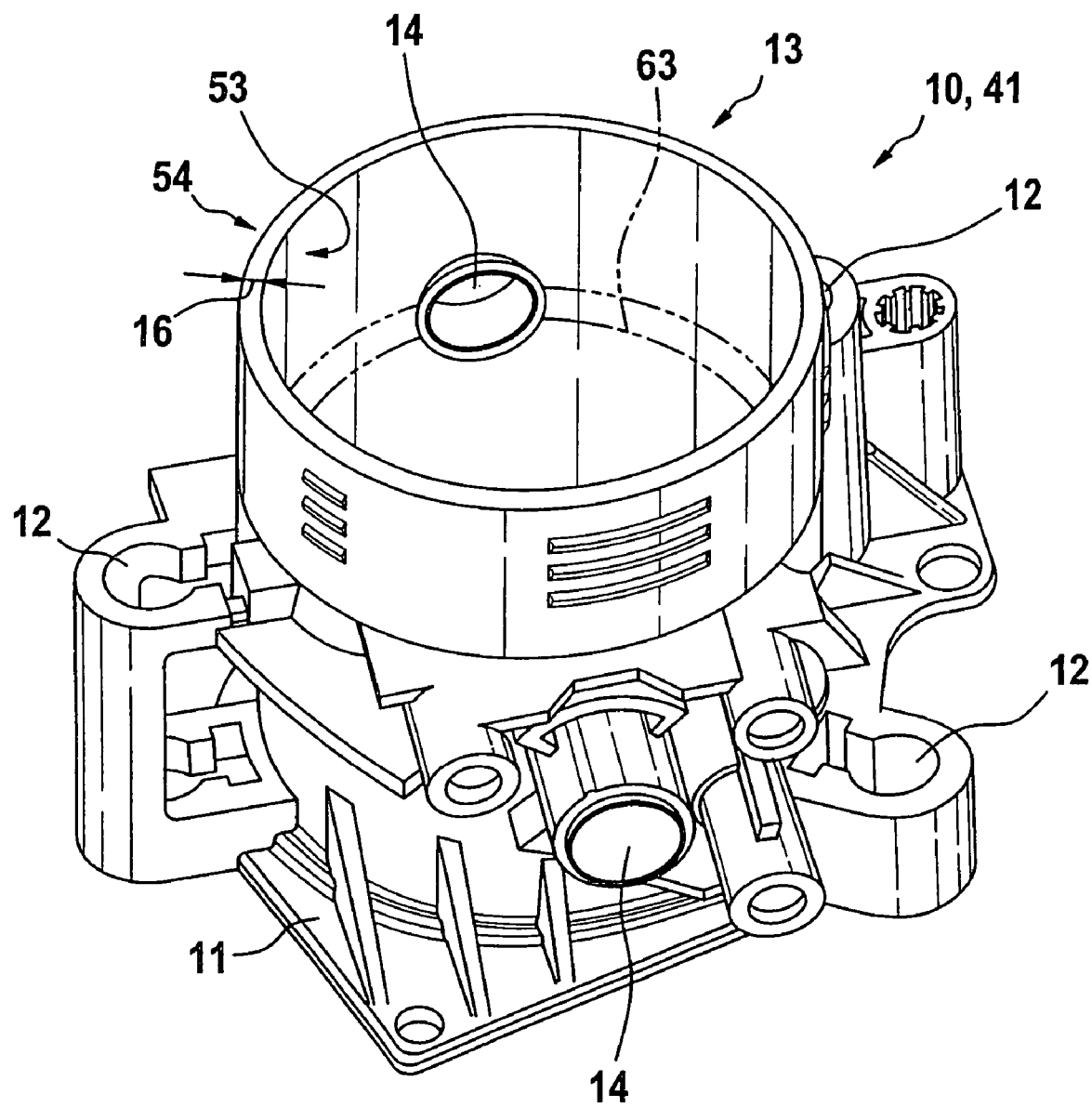
FIGS. 7, 8 show application surfaces on the premolded part onto which lubricant is applied, into which lubricant is rubbed, or to which lubricant is applied in sheet form after formation of the premolded part in a first injection molding station.
Figure 8:
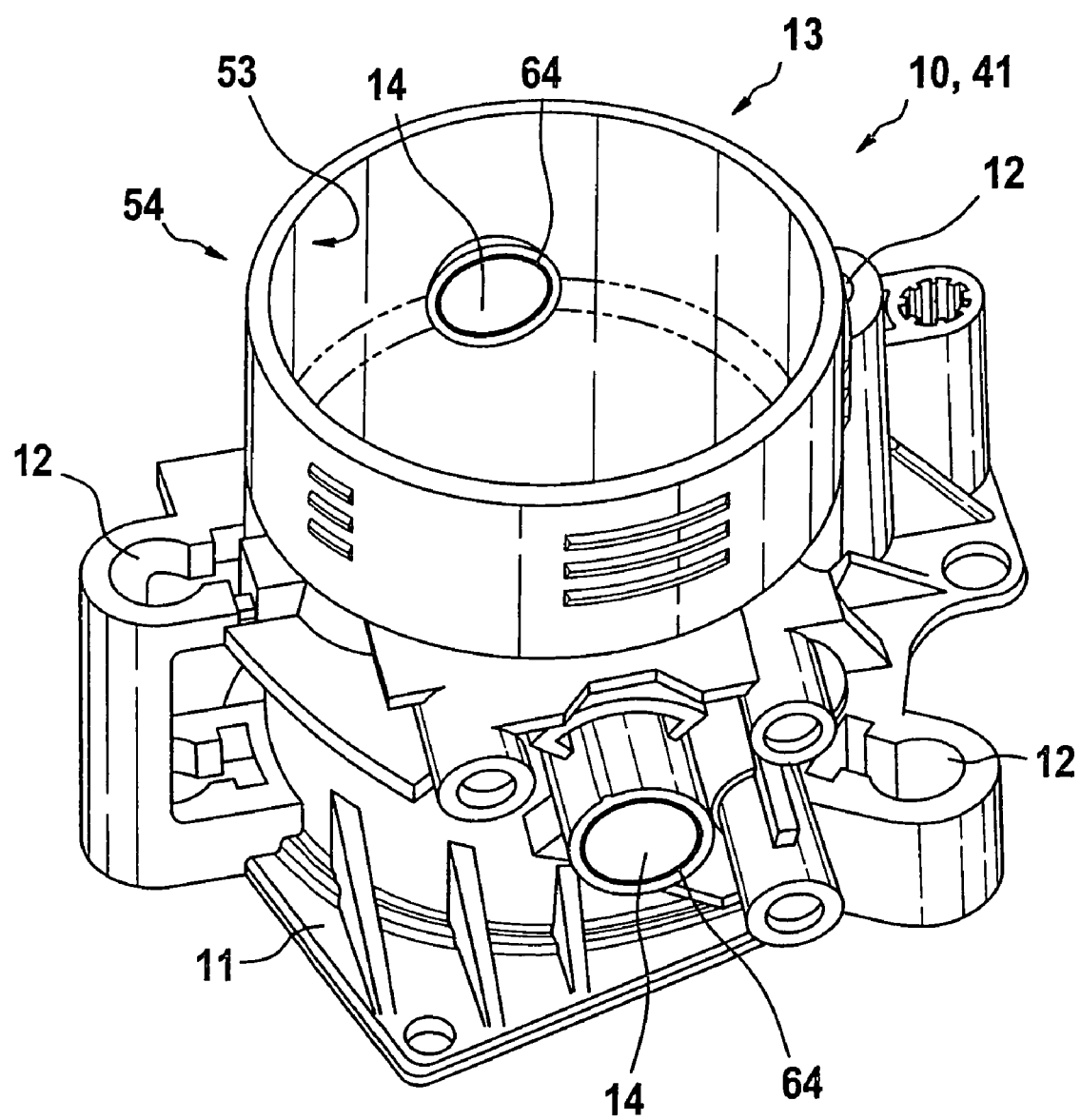

FIGS. 7 and 8 show application surfaces on the premolded part of a housing of a throttle valve unit onto which lubricant is applied, into which lubricant is rubbed, or to which lubricant can be applied in sheet form after formation of the premolded part.

After the intermediate treatment of the premolded part 41 following its manufacture in a first injection molding station and before insertion of the premolded part 41 into the second injection molding station 40, subsequent molding surfaces 63 and 64 for the second plastic material 57, which is then injected into a second cavity 42 delimited by the premolded part 41, have another, third material applied to them so that the first plastic material of the premolded part 41 does not come into direct contact with the second plastic material 57 of which the valve flap part 17 and the flap shaft parts 19 and 20 are produced in the second injection molding station 42. Consequently, the use of the method according to the present invention with separate cavities also makes it possible to use plastic materials that would otherwise adhere to each other.

This also makes it possible to use identical first and second plastic materials to manufacture a throttle valve unit.

The additional, third material with which the first molding surface 63 and the second molding surface 64 of the premolded part 41 are treated permits the use of plastic materials that would otherwise adhere to each other. The material applied to the first molding surface 63 and the second molding surface 64 is preferably a lubricant that is preferably used in the form of a powdered solid, a paste-like prepared mass, or a sheet. This material serves to reduce frictional forces and the resulting frictional wear between the parts in sliding contact with one another, i.e. the inner wall 53 of the premolded part 41 and the sealing edge 23 of the valve flat part 17 made of the second plastic material 57. In this connection, it should be noted that the valve flap part 17 of the throttle valve unit can be embodied either in the form of valve flap part 17 that passes through or in the form of one that does not pass through. Whereas a valve flap part 17 embodied to pass through is accommodated in the gas passage 13 without a stop, a valve flap part 17 that is not embodied to pass through cooperates with a stop provided on the inner wall 53 of the gas passage 13. In both embodiment variants of the valve flap part 17, i.e. one that passes through and one that does not, gaps are produced between the sealing edge 23 of the valve flap part 17 and the inner wall 53 of the gas passage 13 and an air mass flow of between 2 kg/h and 6 kg/h flows through these gaps; this air mass flow is a function of the dimensioning of the gas passage 13 in the premolded housing part 10. Depending on the diametrical dimensioning of the gas passage 13 in the premolded housing part 10, it is also permissible for larger air mass flows to pass through via the sealing edge 13 of a valve flap part 17 that passes through or does not pass through and for the throttle valve unit to still be considered "tight" in terms of the tightness specifications. The additional, third material applied to the first molding surface 63 and the second molding surface 64 can also function as a spacer layer. This additional, third material, in its function as a spacer layer, can be applied in sheet form to the annular first molding surface 63. This offers the advantage that the spacer layer can later be entirely or partially removed, for example by means of thermal influence. The application of the additional, third material to the first application surface 63 of the premolded part 41 permits the formation of a very precisely adjustable gap measurement 62 (see FIG. 6).

According to FIG. 8, the additional, third material can also be applied to the second molding surfaces 64, which are constituted by the inside of the openings 14 in the wall of the premolded part 41 for accommodating the flap shaft parts 19 and 20. After the premolded part 41 has been manufactured in the first injection molding station and subjected to its intermediate treatment, and before insertion of the premolded part 41 into the second injection molding station 40, the openings 14 for accommodating the flap shaft parts 19 and 20 can be coated with the additional, third material in a manner analogous to that of the first application surface 63 of the premolded part 41 as shown in FIG. 7. The additional, third material can be applied in the region of the openings by being spread on or rubbed in, or the openings can be lined with a sheet material.

In FIG. 8, after being removed from the first molding station, the premolded part 41 is coated with the additional, third material in the region of the insides of the openings 14.

Figure 9:
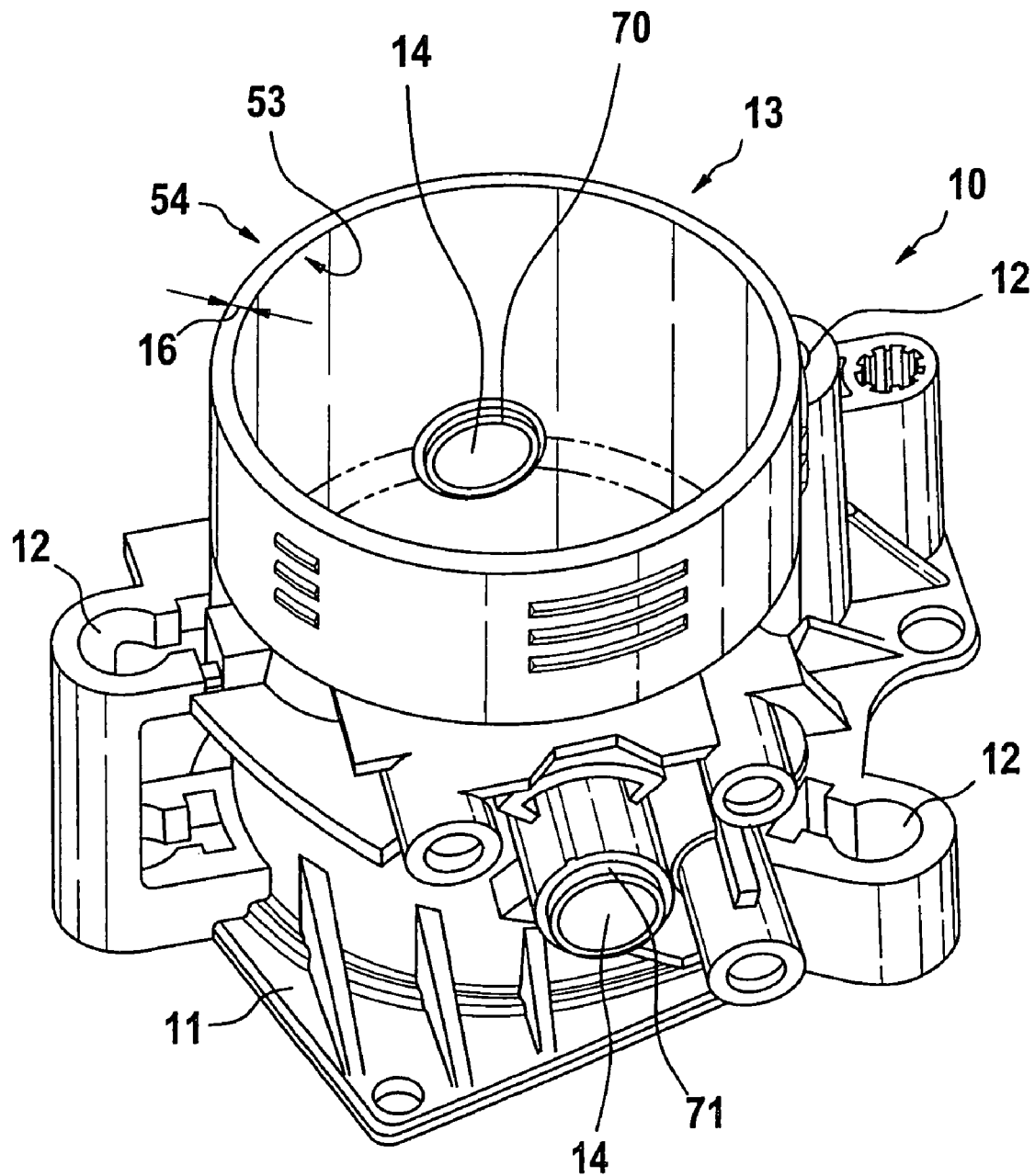
FIG. 9 shows bearing bushes inserted into the premolded part after removal from the first injection molding station.

In another preferred embodiment variant of the method for manufacturing a throttle valve unit, which method forms the basis of the present invention, after the thermal intermediate treatment before insertion of the premolded part 41 obtained in the first injection molding step into the second cavity 42, prefabricated bearing bushes are inserted or press-fitted in an appropriately prestressed manner into the openings 14 provided in the wall of the premolded part 41 (see FIG. 9).

FIG. 9 shows that the first bearing bush 70 and the second bearing bush 71 can be embodied in the form of sleeve-shaped inserts that are press-fitted in a prestressed fashion into the opening of the walls of the housing 10 that delimit the gas passage 13.

The premolded part 41, which constitutes the housing part 10 of a throttle valve unit, is injection molded of the first plastic material and its gas passage 13 is constituted by a plastic material tube embodied with a wall thickness 16. The flange 11, which is provided with variously positioned flange openings 12 that correspond to the respective hole pattern, is situated in the base region of the injection molded part 41. Slide bushes 70 and 71 are inserted or press-fitted into the openings 14 in the wall of the gas passage 13 (also see FIG. 10).

A press-fitted insertion of the slide bushes 70, 71 and of the slide bush 52 in FIG. 5.1 into the wall of the premolded housing part 10 delimiting the gas passage 13 prevents the slide bushes 70, 71, 52 from rotating. In this case, the flap shaft parts 19 and 20 are manufactured so that they are able to rotate in relation to the rotationally fixed slide bushes 70, 71 that have been inserted into the premolded housing part 10. Alternatively, the slide bushes 70, 71 can be injection molded into the wall of the premolded housing part 10 in a rotatable fashion; in this case, the flap shaft parts 19 and 20 of the valve flap part 17 are reverse injection molded into the slide bushes 70 and 71 in a rotationally fixed manner.

Figure 10:
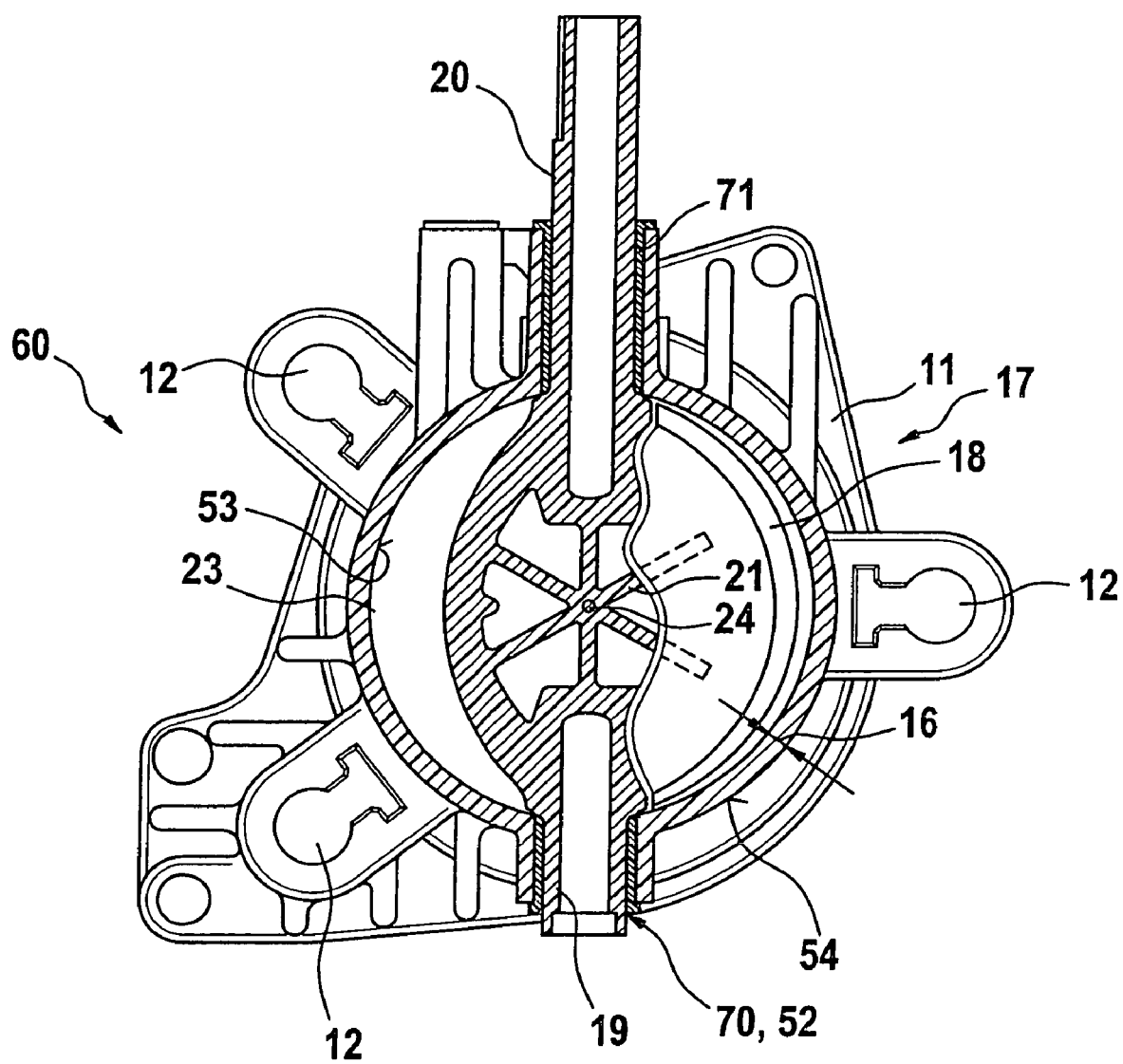
FIG. 10 shows a bottom view of the valve flap part that has been injection molded out of a second plastic material and is equipped with insert bushes/slide bushes.

FIG. 10 shows a cutaway bottom view of the valve flap part that has been injection molded out of the second plastic material, with slide bushes press-fitted onto it.

It is clear from FIG. 10 that on the underside of the flap surface 18 of the valve flap part 17, a for example star-shaped ribbing 21 is produced by the injection point or gate 24. The hollow chambers inside the first flap shaft part 19 and second flap shaft part 20 are clearly visible due to the removal of the horizontally removable first and second core parts 45 and 46. The drawing also shows the first slide bush 70 and second slide bush 71 on the first flap shaft part 19 and the second flap shaft part 20, which slide bushes 70, 71 have been press-fitted or inserted into the openings 14 in the wall of the gas passage 13 before the injection molding of the valve flap part 17 of the second plastic material 57 in the second cavity 42 of the second injection molding station 40.

The gap dimension 61 shown in FIG. 6 is formed between the sealing edge 23 of the flap surface 18 and the inside 53 of the gas passage 13. Depending on the selected tolerance, the gap dimensions 62 are formed at the slide bushes 70 and 71 in the two opposing bearing positions of the valve flap part 17. The outer wall of the housing 10, which is embodied with the material thickness 16, is labeled with the reference numeral 54.

The slide bush labeled with the reference numeral 52 can be inserted into the wall of the premolded part 41 so that the wall accommodates the slide bushes 51, 52 in a rotationally fixed manner. The slide bushes 52 molded in a rotationally fixed manner by the flap shaft parts 19 and 20 of the valve flap part 17 permit the valve flap part 17 embodied with a domed flap surface 18 to rotate; on the other hand, the slide bush 52 can also be designed so that the flap shaft parts 19 and 20 in the depiction according to FIG. 5.1 of the flap part 17, are molded in a rotationally fixed manner in the slide bush 52. In this case, the slide bush 52 is introduced into the wall of the premolded part 41 in such a way that the slide bush 52 can still rotate in relation to the premolded housing part 10. Although FIG. 5.1 shows only half of the valve flap part 17, whose flap shaft part 19 is encompassed by a slide bush 52, the flap shaft parts 17 at both ends can accommodate insert sleeves contained in the premolded part 41. Likewise, as shown in FIG. 5.2, both flap shaft parts 19 and 20 can also be accommodated directly in the premolded part 41, without the interposition of slide bushes 52.

In another advantageous embodiment of the method proposed according to the present invention, in order to influence or to be better able to adjust the gap geometries 61 and 62 between the inner wall 53 of the premolded part 41 and the sealing edge 23 of the valve flap part 17, the injection points 24 and 15, which represent the injection points for the plastic materials, can be specifically positioned at the cavities for the components 10, 41 and 17, 51 to be formed. The molten plastics for filling the cavities enter the first injection molding station and the second injection molding station 40 via the injection points 15 and 24, which represent the filling points of the first and second cavity, respectively. Depending on the geometrical position of the injection points 15, 24 in relation to one another, the orientation of the chain molecules in the plastic materials, and the reinforcing materials and fillers they contain, it is possible to use the flow orientation of the molten plastics to influence the shrinkage behavior of the resulting premolded part 41 and of the valve flap part 17 so that during the cooling phase that follows the injection molding process, the throttle valve unit, i.e. the two-component injection molded part 60, the desired gap dimensions 61, 62 develop between the bearing points of the valve flap part 17—whether of the pass-through or non-pass-through embodiment—and the slide bushes 52, 70, 71, and the required gap dimension of a few μm is produced between the sealing edge 23 of the inner wall 53 of the gas passage 13. The gap dimension between the inner wall 53 of the gas passage 13 of the premolded part 41 and the sealing edge 23 of the valve flap part 17 remains as constant as possible during operation of the throttle valve unit manufactured according to the present invention, even with extreme temperature variations, and experiences no changes that negatively influence the air mass flow that occurs in the sealed position of the valve flap part 17—whether of the pass-through or non-pass-through embodiment—and the inner wall 53 of the gas passage 13.

In the plastic materials currently used for the premolded part 41, which represents the housing part 10, and for the valve flap part 17, it is possible for these plastic materials to contain high reinforcing fiber contents. Because of the high reinforcing fiber content, which reduces geometrical changes in the fiber direction on reorientation of the polymer chains and reduces expansion coefficients in the fiber direction, in order to achieve a high degree of geometrical stability of the finished injection molded unit 60 with regard to gap dimensions 61, 62 of the premolded part 41, the housing can be injection molded centrally in the middle via several punctiform injection points 15 on the circumference of the wall that the limits the gas passage 13, close to the valve flap plane the valve flap part 17 itself. In the region of the flap shaft parts 19, 20 injection molded into the premolded part 41, the fiber directions in the flap shaft parts 19 and 20 are oriented parallel to the axis of the valve flap part 17, which results in a shrinkage behavior that causes similar shrinkages to occur in the premolded part 41 and in the valve flap part that is molded inside it.

Using the two-component injection molding method proposed according to the present invention in spatially separate cavities in two sequentially operated injection molding stations makes it possible by to manufacture throttle valve units with a high degree of precision in which finishing work is negligible, the rejection rates of premolded parts 41 are drastically reduced, and the gap geometries 61 and 62 achieved are assured of remaining unchanged over the service life of the air conveying device thanks to the early reduction of internal stresses that would have led to deformations.

According to another, final embodiment variant of the method proposed according to the present invention for manufacturing a throttle valve unit, when there are impermissibly large gap dimensions 61, 62 between the sealing edge 23 of the valve flap part 17 and the inner wall 53 of the gas passage 13 and between the insert sleeves or slide bush gaps, an additional, fourth material can be introduced into the two-component injection molded part 60. This additional, fourth material can serve to form a lubricating layer between the valve flap part 17 and the inner wall 53 of the gas passage 13 that it moves in relation to; between the flap shaft parts 19 and 20 and the slide bushes 52, 70, and 71; and between the slide bushes 52, 70, 71 and the openings in the premolded housing part 10. If this fourth material is completely or partially removed, then the gap dimensions 61, 62 in the two-component injection molded part 60 that previously lay outside the tightness specifications can now lie within the tightness specifications of the throttle valve unit. Analogous to that which has been mentioned above, the tightness specifications for throttle valve units can depend on the diameter of the gas passage 13 in the premolded housing part 10, which represents the premolded part 41. A throttle valve unit that meets the tightness specifications is considered to be "tight" in terms of tightness specifications if the air mass flow passing through the gaps between the sealing edge 23 and the inner wall 53 of the premolded part 10 or the gap geometries 61, 62 lies within a range from 2 kg/h to 6 kg/h.

The foregoing relates to preferred exemplary embodiment of the invention, it being understood that other variants and embodiments thereof are possible within the spirit and scope of the invention, the latter being defined by the appended claims.

The invention claimed is:

1. A method for manufacturing a throttle valve unit having a housing part and a valve flap part that is able to move in relation to the housing part, the method comprising including the following process steps:
   a) injection molding the housing part of the throttle valve unit out of a first plastic material in a first cavity,
   b) transferring the molded housing part obtained according to process step a) to a second cavity spatially separate from the first cavity,
   c) injection molding the movable valve flap part of the throttle valve unit out of a second plastic material inside the molded housing part in the second cavity, the first and second plastic materials being injected into the first and second cavities, respectively, through injection points positioned in the cavities in such a way that the flow orientation of chain molecules of the plastic materials and their reinforcing and filler materials are used to influence the shrinkage behavior of the housing part and the valve flap part during the cooling phase so that the second plastic material of the valve flap part shrinks away from the housing part in the intended manner in order to provide the desired gap between the housing part and flap part, and
   d) inserting bushes into openings of the molded housing part or applying a third material into the gap.

2. A method for manufacturing a throttle valve unit having a housing part and a valve flap part that is able to move in relation to the housing part, the method comprising process steps:
   a) injection molding the housing part of the throttle valve unit out of a first plastic material in a first cavity,
   b) transferring the molded housing part obtained according to process step a) to a second cavity spatially separate from the first cavity,
   c) injection molding the movable valve flap part of the throttle valve unit out of a second plastic material inside the molded housing part in the second cavity, and
   d) inserting bushes into openings of the molded housing part and/or applying an additional material after process step a) onto molding surfaces of the second plastic material of the valve flap part to be subsequently injection molded in the molded housing part, wherein the second plastic material of the valve flap part is a partially crystalline thermoplastic with a melting temperature lower than that of the plastic material used for the injection molding of the molded housing part.

3. A method for manufacturing a throttle valve unit having a housing part and a valve flap part that is able to move in relation to the housing part, the method comprising following process steps:
  a) injection molding the housing part of the throttle valve unit out of a first plastic material in a first cavity,
  b) transferring the molded housing part obtained according to process step a) to a second cavity spatially separate from the first cavity,
  c) injection molding the movable valve flap part of the throttle valve unit out of a second plastic material inside the molded housing part in the second cavity, and
  d) inserting bushes into openings of the molded housing part and/or applying an additional material after process step a) onto molding surfaces of the second plastic material of the valve flap part to be subsequently injection molded in the molded housing part, wherein
the second plastic material of the valve flap part is an amorphous high-temperature thermoplastic with a melting temperature lower than that of the plastic material used for the injection molding of the molded housing part.

4. A method for manufacturing a throttle valve unit having a housing part and a valve flap part that is able to move in relation to the housing part, the method comprising the following process steps:
  a) injection molding the housing part of the throttle valve unit out of a first plastic material in a first cavity,
  b) transfer of the molded housing part of the housing part obtained according to process step a) to a second cavity spatially separate from the first cavity,
  c) injection molding the movable valve flap part out of the throttle valve unit of a second plastic material inside the molded housing part in the second cavity,
  d) demolding the valve flap part obtained according to process step c) in a position of the valve flap part inside the molded housing part that produces an extremely narrow gap geometry or in a sealed position of the valve flap part inside a gas passage of the molded housing part, which position is defined during the injection of the second plastic material for the valve flap part, and
  e) applying a third material into the gap.

5. The method according to claim 4, wherein the valve flap part is injection molded inside the molded housing part, in a position that permits it to pass through the gas passage of the molded housing part.

6. The method according to claim 4, wherein the valve flap part is injection molded out of the second plastic material in an inclined position that prevents the valve flap part from passing through the cross section of the gas passage of the molded housing part.

7. The method according to claim 4, further comprising forming gaps between the valve flap part and a gas passage of the molded housing part and at bearing points of the valve flap part, the gaps being selectively adjusted according to process step d), demolding the valve flap part obtained according to process step c) inside the premolded part in a position of the valve flap part inside the molded housing part that produces an extremely narrow gap geometry or in a sealed position of the valve flap part inside a gas passage of the molded housing part, which position is defined during the injection of the second plastic material for the valve flap part.

8. A method for manufacturing a throttle valve unit having a housing part and a valve flap part that is able to move in relation to the housing part, the method comprising including the following process steps:
  a) injection molding the housing part of the throttle valve unit out of a first plastic material in a first cavity,
  b) transferring of the molded housing part obtained according to process step, a to a second cavity spatially separate from the first cavity,
  c) injection molding the movable valve flap part of the throttle valve unit out of a second plastic material inside the molded housing part in the second cavity, and
  d) inserting bushes into openings of the molded housing part so that the bushes are rotationally fixed in relation to the molded housing part, before or during the transfer of the molded housing part to the second cavity,
wherein the bushes are made of a metallic or nonmetallic material with a low coefficient of friction in comparison to the first plastic material or the second plastic material.

9. A method for manufacturing a throttle valve unit having a housing part and a valve flap part that is able to move in relation to the housing part, the method comprising following process steps:
  a) injection molding the housing part of the throttle valve unit out of a first plastic material in a first cavity,
  b) transferring the molded housing part obtained according to process step a) to a second cavity spatially separate from the first cavity,
  c) injection molding the movable valve flap part of the throttle valve unit out of a second plastic material inside the molded housing part in the second cavity, and
  d) introducing a third material into the gap geometries of the two-component injection molded throttle valve unit where the gap geometries lie outside the tightness specification before the introduction of the third material and then—after the partial removal of the third material—lie within the tightness specification.

10. A method for manufacturing a throttle valve unit having a housing part and a valve flap part that is able to move in relation to the housing part, the method comprising following process steps:
  a) injection molding the housing part of the throttle valve unit out of a first plastic material in a first cavity,
  b) transferring the molded housing part obtained according to process step a) to a second cavity spatially separate from the first cavity,
  c) injection molding the movable valve flap part of the throttle valve unit out of a second plastic material inside the mold housing part in the second cavity,
  d) providing bushes between the molded housing part and the flap part, and
  e) introducing a fourth material into the gap geometries of the two-component injection throttle valve unit with bushes where the gap geometries lie outside the tightness specification before the introduction of the fourth material and then—after the partial removal of the fourth material—lie within the tightness specification.

* * * * *